Sept. 27, 1960 T. B. HORGAN 2,954,538
TEMPERATURE COMPENSATED PERMEABILITY-TUNED INDUCTOR
Filed May 15, 1956 3 Sheets-Sheet 1

*INVENTOR.*
THOMAS B. HORGAN
BY Alden D. Redfield
Warren Kunz
ATTORNEYS.

INVENTOR.
THOMAS B. HORGAN

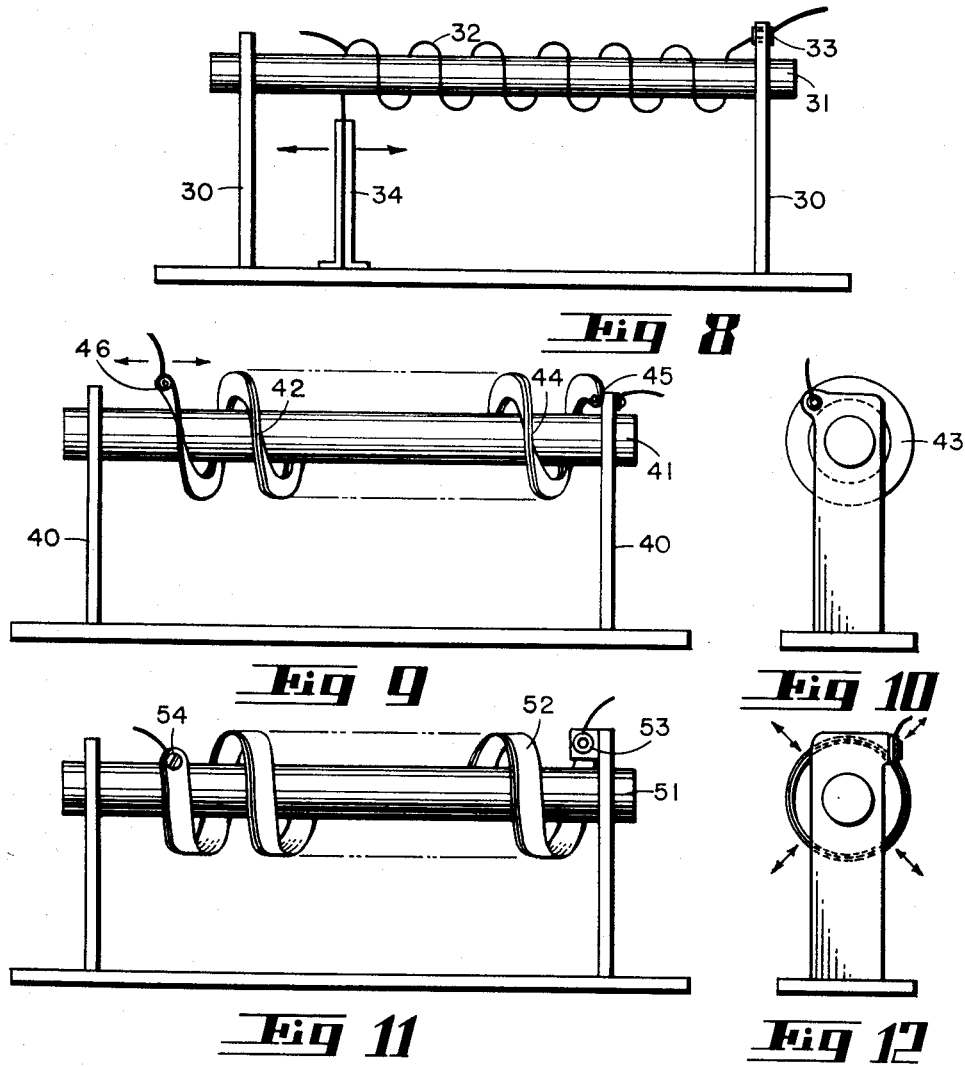

United States Patent Office 2,954,538
Patented Sept. 27, 1960

2,954,538

TEMPERATURE COMPENSATED PERMEABILITY-TUNED INDUCTOR

Thomas B. Horgan, Cincinnati, Ohio, assignor to Avco Manufacturing Corporation, Cincinnati, Ohio, a corporation of Delaware Filed May 15, 1956, Ser. No. 585,046

1 Claim. (Cl. 336—30)

The present invention relates broadly to a temperature compensated permeability-tuned inductor and, more specifically, to a temperature compensated antenna used for intercepting signals at radio frequencies.

The present invention has broad utility in connection with cored inductors which are subject to temperature variations, regardless of the cause of such variations. The inductance of an inductor is a function of the permeability of its core, which, in turn, varies with temperature. It necessarily follows that the inductance changes with temperature which is objectionable in an application requiring a substantially fixed inductance. The value of the present invention, which automatically compensates for change of core permeability due to temperature change, will therefore be readily appreciated, since it affords an inductor of substantially constant value.

Although the present invention relates broadly to inductors, for convenience it will be described with particular reference to a radio antenna which is subject to temperature variations. The cause of the variations is immaterial although in most cases variation will result from either change of ambient temperature or from heat generated during operation of the radio with which the antenna is associated.

It is well-known that optimum response of a radio to an input signal is a function of the Q value of its antenna, Q being defined as the ratio of $L/R$ where L is the inductance of the antenna and R is its resistance. For optimum response, L should, therefore, be relatively high. It is also known that in loop type antennas the value of L varies as a function of temperature. This is undesirable since the product of the inductance and capacitance of the antenna "tank" circuit should remain constant, i.e., $LC=k$ for any given response frequency. It follows, therefore, that frequency response of the antenna tank will vary with temperature unless compensating means is provided to counteract the change of inductance with temperature.

As has been explained, it is desirable to use inductance of high value. Unfortunately, the larger the inductance, the larger also is the variation resulting from temperature change. This is particularly pronounced in an antenna having a core of high permeability, Mu, such as sintered ferrite.

In the usual antenna tank, tuning is effected by change of capacitance in a resonant circuit of capacitance and inductance. For each tuned frequency, therefore, the value of C as well as $k$ in the equation $LC=k$ is different. With this thought in mind, the shortcomings of capacitance compensation for change of inductance can be readily demonstrated. For instance, assume that for a particular frequency response, the circuit has been tuned so that:

$$Lc_1 = k_1$$

Now, with a change in temperature the inductance will be assumed to change by an amount equal to $\Delta L$. Since for the tuned frequency the value of $k_1$ must remain constant, temperature compensation through capacitance change must be such that:

$$(L+\Delta L)(C_1-\Delta C_1) = k_1$$

Multiplying terms and subtracting the original equation $LC_1=k_1$ and solving for $\Delta C_1$, it will be found that:

$$\Delta C_1 = \frac{\Delta L(C_1)}{L+\Delta L}$$

Thus, the amount of capacitance correction required for any given change of temperature is not a constant but is a function of the particular tuned resonant frequency of the circuit. In other words, the amount of correction is a function of the capacitance of the circuit which is tuned to obtain different frequencies. Thus, a simple temperature compensating capacitor is not satisfactory for compensating for change of inductance with change of temperature.

Accordingly, it is more desirable to hold the inductance constant regardless of temperature change. By means of the present invention, constant inductance is automatically and accurately attained.

In brief, one form of the present invention comprises a stationary magnetic ferrite core of high permeability surrounded by a tubular coil form on which is wound the coil of the loop antenna. The coil form is positioned with respect to the core by means of a thermally sensitive device, such as a bimetallic strip. Shift of the coil form with respect to the core resulting from movement of the strip changes the flux density in the core and compensates for change of permeability with temperature. It is immaterial whether the core is shifted with respect to the coil form or vice versa. The important consideration is that the correct relative positions of the elements are determined by a temperature sensitive device.

In another version of the invention a stationary magnetic core having antenna windings slidably supports a shading sleeve which is positioned with respect to the core by thermally sensitive means. Here again the important thing is the relative positions of the elements and it is possible to arrange the thermally sensitive device to shift the core rather than the shading sleeve which then remains stationary.

In still another version of the invention, a thermally sensitive device is provided for imparting movement to one end of a resilient coil of wire surrounding a fixed core, while the other end of the coil is held stationary. In a further modification, the windings about the core comprise a coil made from bimetallic or other thermally sensitive material. The coil may be formed so that change of temperature results in expansion or contraction relative to the length of the core, or it may be formed so that the coil enlarges radially relative to the core with temperature change.

It will be understood from the foregoing that an object of the present invention is to provide a temperature compensated inductor of substantially constant inductance. It is also an object of the present invention to provide an inductor having a temperature sensitive magnetic core which is temperature compensated to maintain its inductance within predetermined limits.

A further object of the invention is the provision of a loop antenna which operates at a stable tuned frequency in an antenna tank circuit regardless of prevailing temperature conditions.

A more specific object of the invention is the provision of a magnetic core and a coil form bearing antenna windings which are positioned relative to each other in proportion to prevailing temperatures whereby the inductance of the antenna and the response frequency of the tank circuit are maintained constant.

Another object of the invention is the provision of a wire wound antenna core and a shading sleeve which are positioned relative to one another by a temperature sensitive element to maintain inductance of the windings constant.

It is also an object of this invention to provide a temperature compensated inductor, including windings in the form of a resilient coil, the length of which is adjusted by the movement of thermally responsive means in proportion to prevailing temperatures.

A further object of the invention is the provision of a temperature compensated inductor having windings made from thermally sensitive material whereby the windings shift automatically relative to the core to effect temperature compensation and maintain the inductance constant.

The novel features that are considered characteristic of the invention are set forth in the appended claim; the invention itself, however, both as to its organization and method of operation, together with additional objects and advantages thereof, will best be understood from the following description of specific embodiments when read in conjunction with the accompanying drawings, in which:

Figure 8 shows a modification of the invention in which the wndings are in the form of a resilient coil of wire;

Figure 9 shows another modification of the invention including windings in the form of a coil made from thermally sensitive material, which automatically changes in length with respect to a central core as a result of temperature change;

Figure 10 is an end view of the structure shown in Figure 9;

Figure 11 shows still another modification of the invention, in which the windings are in the form of a coil made from thermally sensitive material which automatically changes in diameter as a result of temperature change; and Figure 12 is an end view of structure shown in Figure 11.

For convenience, the preferred embodiment of the present invention is described as applied to the antenna of a transistorized radio although it should be understood that it has equal utility when applied to the antenna of a vacuum tube type radio. Hence, the illustration of primary and secondary windings in conjunction with other antenna tank components does not constitute a limitation of the present invention.

Figure 7:
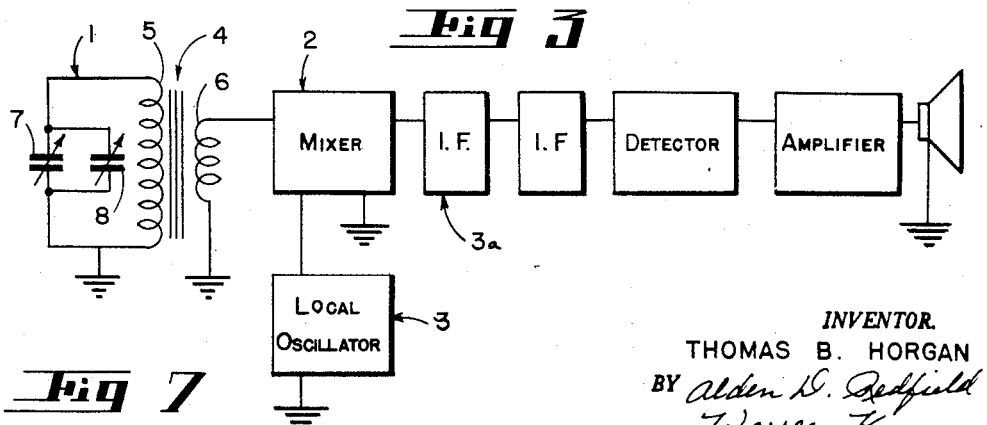
Figure 7 is a schematic circuit diagram of a transistorized radio with which the invention finds utility.

Before considering specific structual details of the invention, attention is directed to Figure 7 which discloses an antenna tank circuit, generally designated 1, which picks up a transmitted signal which is delivered to a mixer circuit, generally designated 2. The output of a local oscillator, generally designated 3, is also fed to the mixer circuit which delivers its output to an intermediate frequency (I.F.) circuit, generally designated 3a. The organization of these circuit components in a radio receiver is well-known in the art and need not be described in detail for the purposes of the present invention.

Attention is now directed more specifically to the organization of the antenna tank circuit. It will be noted that it includes a loop antenna 4 having primary and secondary windings 5 and 6. The output of the secondary winding 6 is supplied to the mixer circuit. The tank circuit also includes a tuning condenser 7 and a trimmer capacitor 8, both connected in parallel with the primary windings 5. For stable response at a given frequency, the product of the inductance of the loop antenna and the effective capacitance of condensers 7 and 8 must be maintained constant.

As mentioned earlier, sensitivity and response of a cored antenna varies in proportion to its Q value, i.e.

$$\frac{L}{R}$$

A high Q may be obtained by associating with the windings 5 and 6 a sintered ferrite core of high permeability mu. Unfortunately, however, permeability of the ferrite varies significantly with changes in temperature, and even a moderate temperature change seriously affects the tuning and overall performance of a radio receiver associated with the antenna.

As will be described in detail shortly, the antenna core is preferably formed as a straight rod. Since the ends of the rod are spaced, the air gap between is very appreciable. Without such an air gap the antenna would have no pickup. By proper adjustment of the air gap, the antenna can be made insensitive to temperature change, but such adjustment is accurate for only one frequency, and pickup efficiency is relatively poor. Hence the present invention offers a far superior solution to the problem of antenna sensitivity to temperature change.

Figure 1:
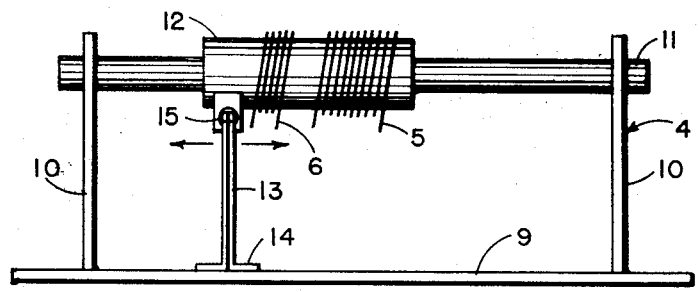
Figure 1 is a diagrammatic representation of the invention adapted for use as a loop antenna for a transistor type radio.

Attention should now be directed to Figure 1 which shows a stationary base 9, such as the chassis of a radio, and a pair of rigid supports 10 fixedly secured to the base. Attached to these supports is a magnetic core 11 which may be made from sintered ferrite or any other material having a high permeability.

Surrounding the core is a coil form 12 on which is wound windings 5 and 6. The coil form is concentric with and slidable on the core. Movement is imparted to the coil form by means of a thermally sensitive member 13, one end of which is fixedly secured to the base, as at 14, the other end of which is pivotally attached to the coil form, as at 15. The thermally sensitive means may take the form of a bimetallic strip or a bimaterial strip having a piece of metal intimately joined to a piece of plastic or other nonmetallic material having a coefficient of thermal expansion different from that of the associated metal. Any other thermally sensitive means may be used to shift the coil form relative to the core and to position it in a predetermined position for each operating temperature.

Figure 4:
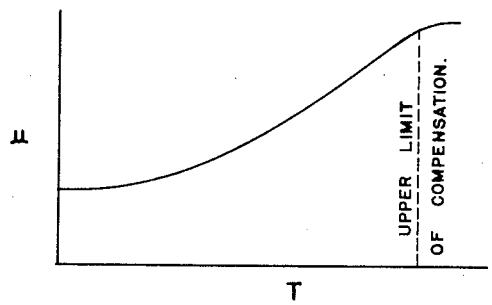
Figure 4 is a curve showing the change of permeability of ferrite with change of temperature.
Figure 5:
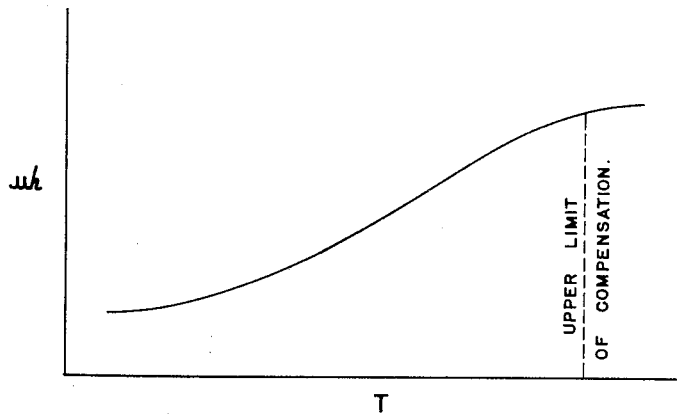
Figure 5 is a curve showing the relation of inductance to temperature for a ferrite cored inductor.

Attention should now be directed to Figure 4. This shows the variation of permeability of a large gap ferrite core as a function of temperature. It will be noted that the permeability increases as the temperature increases. Figure 5 illustrates the change of inductance of an inductor resulting from change of permeability of its ferrite core, as illustrated in Figure 4. It necessarily follows, therefore, that for any one position of the coil form relative to the core, the inductance of the antenna and hence the response frequency of the tank circuit of which it is a part will vary with temperature. This is highly undesirable since a modern radio, particularly a portable radio, necessarily must operate over a wide range of temperatures. For instance the radio, when assembled, may be subjected to a temperature vastly different from that encountered when in use. Further, heat generated by operation of the set will necessarily affect the temperature of the antenna. This will result in shift of its response frequency and poor tracking with respect to the signal supplied by the local oscillator to the mixer circuit. Use of the present invention will avoid these undesirable effects.

Figure 6:
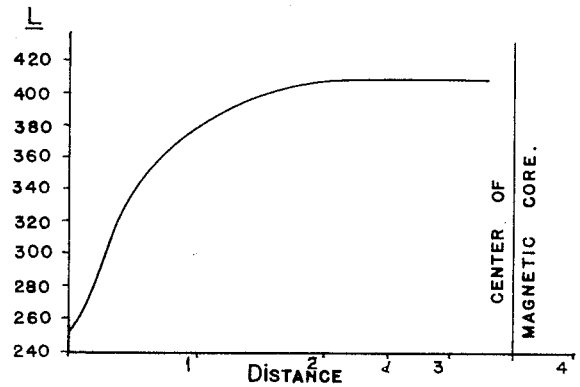
Figure 6 is a curve showing the relation of inductance to the position of the windings of the loop antenna with respect to a ferrite core.

It has been found by actual experiments that movement of the coil form with respect to the magnetic core will change the inductance of the loop antenna, as illustrated by the curve of Figure 6. From a study of this figure derived from tests using a straight ferrite rod seven inches long, it will be noted that the inductance at first varies rapidly as the windings are shifted away from the end of the core. Thus, one inch of movement changes the inductance from approximately 250 microhenries to 380 microhenries. The next inch of movement changes the inductance more gradually from 380 to approximately 410 microhenries. By working with the steep portion of the curve and using the design value of, for instance, 380 microhenries, temperature compensation can easily be accomplished by relatively small movements of the windings with respect to the core.

Figure 3:
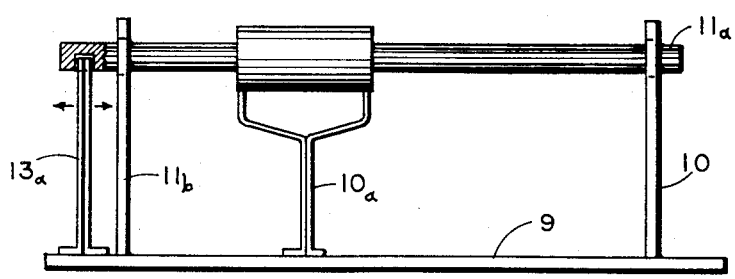
Figure 3 is a simplified representation of a modified arrangement of elements of the invention.

It is timely to point out that inductance is a function of the position of the windings with respect to the core. Hence, it will be appreciated by those skilled in the art that it is within the comprehension of this invention to hold the coil form stationary and move the core by means of the thermally responsive means. The resulting compensation of the inductance will be the same. Such a rearrangement of elements is schematically illustrated by Figure 3 which shows temperature responsive means 13a imparting movement to core 11a slidably supported by standards 11b. In this modification the coil form is held stationary by support 10a.

Figure 2:
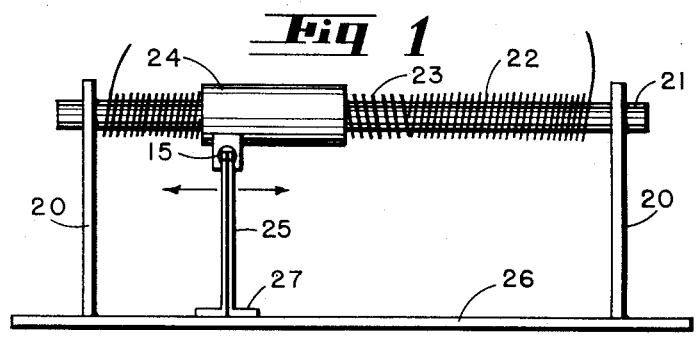
Figure 2 shows a modified temperature compensated loop antenna for use in a transistorized radio.

Attention is now directed to a modification of the invention shown in Figure 2. Here the core 21 is again fixedly positioned by supports 20 and the primary and secondary windings 22 and 23, respectively, are wound directly on the core rather than on the coil form, as in the previous version of the invention. Instead of providing a coil form, there is provided, a shading sleeve 24 which concentrically surrounds and is movable with respect to the core 21. The shading sleeve is pivotally attached to one end of a thermally sensitive means 25, the other end of which is fixedly attached to a base 26, as at 27. Here again, inductance of the loop antenna is a function of the position of the shading sleeve relative to the windings. It will be understood by those skilled in the art that the value of the inductance and nature of the inductance change resulting from sleeve movement will also be a function of sleeve material which may be either paramagnetic, such as sintered ferrite, or diamagnetic such as copper or brass. Here again, positioning of the sleeve by means of the thermally sensitive means will result in maintenance of a fixed value of inductance regardless of the prevailing temperature.

It will also be obvious to those skilled in the art that the relative positioning of the elements is what determines the value of the inductance. Hence the shading sleeve can be held stationary and the magnetic core 21 moved by means of the thermally sensitive means, as suggested schematically by Figure 3. Broadly considered, the important consideration is that the core and sleeve, or coil form, have predetermined relative positions for any given temperature.

Attention is now directed to Figure 8, which shows stationary supports 30 fixedly positioning a magnetic core 31. This core slidably supports winding 32, which in this version of the invention are in the form of a resilient coil of insulated wire. It will be noted that the rigid coil form of Figure 1 has been omitted and that the coil of wire shown in Figure 8 can be stretched and contracted longitudinally with respect to the core 31. One end of the coil is fixed to the support 30 by insulating means, as at 33; the other end of the coil is secured to a thermally sensitive member 34.

For each operating temperature member 34 assumes a different position and the windings 32 are correspondingly positioned relative to core 31. Inductance is held constant by stretching the windings to offset the increase of permeability resulting from temperature increase. Conversely, the windings are contracted with decrease in temperature to offset the accompanying decrease of core permeability.

In Figure 9 is shown a modification of the invention including supports 40 for fixedly positioning a core 41. About this core are positioned windings 42 formed as a coil made from thermally sensitive material such as a bimetal or a bimaterial. As shown in Figure 10 the coil has a rather large radial face width, as shown at 43, but it is quite thin in cross section, as indicated at 44 in Figure 9.

One end of windings 42 is held stationary, being secured at 45 by insulating means to support 40. The other end 46 of the windings is free to move relative to the core. Because of the formation of windings 42, they will undergo an elongation with temperature increase and a contraction with temperature decrease, such movement of the windings offsetting change of permeability graphically illustrated in Figure 4.

Another modification of the invention, shown in Fig. 11, also involves windings 52 made as a coil from thermally sensitive material such as a bimetal or bimaterial. As illustrated in Figures 11 and 12, the windings 52 are formed of strip material having its widest dimension parallel to the axis of stationary core 51. Here again, one end of the windings is held stationary, as at 53, while the other end 54 is free to move. Because of the formation of the coil, it increases in diameter with temperature increase and decreases in diameter with temperature decrease. Such movements of the windings offset change of permeability with change of temperature as illustrated in Figure 4.

As will be understood by those skilled in the art, the windings must always be insulated from the core for satisfactory operation. This may be done by enamelling the core, or the windings, or in any other convenient way.

In conclusion, it is pointed out that the present invention, which is simple and inexpensive, can be utilized to compensate completely for temperature variations and to maintain the response frequency of an antenna tank circuit substantially constant regardless of the temperatures to which the circuit is subjected, provided that a temperature stable tuning condenser is used. Thus, for example, in a radio properly aligned at the point of manufacture, response frequency will remain stable and constant for any position of the tuning condenser regardless of the prevailing temperature. Thus, a radio set equipped with this invention will give satisfactory operation whether used outdoors in a cold climate or indoors in a heated room.

The various features and advantages of the design and construction disclosed are thought to be clear from the foregoing description. Various other features and advantages not specifically enumerated will undoubtedly occur to those versed in the art, as likewise will many variations and modifications of the preferred embodiment of the invention illustrated, all of which may be achieved without departing from the spirit and scope of the invention as defined by the following claim:

I claim:

An inductor comprising: an elongated, high permeability, ferrite core; a coil mounted on the axis of said core and between the ends thereof, the center of said coil being adjustably positioned at a point on said axis, said core having characteristics such that the permeability thereof varies as a function of temperature and such that the inductance of said coil changes at a varying rate as said coil and core are relatively moved, said point on said core being selected at the position where the variation of inductance of said coil is maximum when said core and coil are relatively moved; and means responsive to changes in temperature for moving said coil relative to said point to maintain constant the inductance of said coil.

References Cited in the file of this patent

UNITED STATES PATENTS

| | | |
|---|---|---|
| 2,100,412 | Scott | Nov. 30, 1937 |
| 2,234,002 | Harvey | Mar. 4, 1941 |
| 2,340,749 | Harvey | Feb. 1, 1944 |
| 2,439,809 | Hunter | Apr. 20, 1948 |
| 2,563,413 | Ostrow | Aug. 7, 1951 |
| 2,750,497 | Stott | June 12, 1956 |

OTHER REFERENCES

"Ferromagnetism" by Bozorth, published by D. Van Nostrand Co., Inc., September 18, 1951, pages 248 and 249.